United States Patent [19]

Ohkubo et al.

[11] Patent Number: 5,313,356

[45] Date of Patent: May 17, 1994

[54] THIN FILM MAGNETIC HEAD HAVING A MAGNETIC/NON-MAGNETIC LAMINATE STRUCTURE WITH THE NON-MAGNETIC MATERIAL BEING A METAL OR AN INSULATING NITRIDE

[75] Inventors: Keiji Ohkubo; Hisashi Yamazaki; Kiyoto Yamaguchi; Yoshiharu Kashiwakura, all of Kawasaki, Japan

[73] Assignee: Fuji Electric Co., Ltd., Kawasaki, Japan

[21] Appl. No.: 804,331

[22] Filed: Dec. 10, 1991

[30] Foreign Application Priority Data

Dec. 12, 1990 [JP] Japan .................................. 2-401439

[51] Int. Cl.⁵ .............................................. G11B 5/31
[52] U.S. Cl. .................................................... 360/126
[58] Field of Search ................ 360/126; 428/336, 611; 156/306

[56] References Cited

FOREIGN PATENT DOCUMENTS 55-84019  6/1980  Japan .
60-57515  4/1985  Japan .
64-4908   1/1989  Japan .
64-42011  2/1989  Japan .

OTHER PUBLICATIONS

IBM Disclosure Bulletin, vol. 21, No. 11, 1979, pp. 4367.

*Primary Examiner*—Robert S. Tupper
*Attorney, Agent, or Firm*—Spencer, Frank & Schneider

[57] ABSTRACT

A thin film magnetic head includes a magnetic core composed of upper and lower magnetic pole films spaced apart to define a read-write gap and a coil disposed between the upper and lower magnetic pole films in an area outside of the gap. The upper and lower magnetic pole films each comprise a thin-film laminate having alternating magnetic and non-magnetic thin films. The magnetic thin film includes an amorphous Co alloy having a soft magnetic property and a thickness within a range of 0.1 $\mu$m to 0.5 $\mu$m and the non-magnetic thin-film includes a non-magnetic metal or an insulating nitride.

14 Claims, 7 Drawing Sheets

THIN FILM MAGNETIC HEAD HAVING A MAGNETIC/NON-MAGNETIC LAMINATE STRUCTURE WITH THE NON-MAGNETIC MATERIAL BEING A METAL OR AN INSULATING NITRIDE

BACKGROUND OF THE INVENTION

1. Field of the Invention

This invention relates to a thin film magnetic structure for use in a magnetic head of a disc storage apparatus, and more particularly, for use in a magnetic head having a magnetic circuit and a coil are formed of thin films, and the method of fabricating the thin film magnetic structure.

2. Description of the Prior Art

It has been recognized that distinguished advances have occured in the technology of magnetic disc storage apparatus with significant improvement in storage capacity, and a single disc with 3.5 inches diameter can store several hundred mega bytes of data on it. For further improvement in storage capacity in high-density recording environments, it is required to make the width of a track on a disc even smaller and to record data with higher density in each track. In order to satisfy this requirement, interests in thin film magnetic heads having a fine structure to be used as a read-and-write head have been increased. This kind of magnetic head is made by integrating all the functional components such as magnetic cores and coils in the form of thin films on a single substrate by means of semiconductor fabricating technologies. In the following, a structural example of a general thin film magnetic head is explained referring to FIGS. 1 and 2.

A coil 30 shown at the center of FIG. 1 is a spiral coil, and a magnetic core 10 is composed of a pair of magnetic pole films 15 and 16 shaped like the cross-section of an onion between which a part of the coil 30 is placed. In the top part 10a of the magnetic core 10, a read-and-write gap G having a narrow gap width w is formed between magnetic pole films 15 and 16, and a magnetic circuit is defined by contacting the other end parts of magnetic pole films 15 and 16 to each other at the base part 10b of the magnetic core 10. Where the gap G is placed close to or in contact with a surface of a disc, the magnetic head formed as in the above structure can write data on the disc by leading electric current into the coil 30 through a pair of lead lines 30a and 30b and the magnetic head can read data on the disc by detecting induced electric current in the coil 30.

FIG. 2 is a cross-sectional view through line X—X of FIG. 1, showing an enlarged cross-sectional view of the read-and-write gap. A lower-side magnetic pole film 15 composed of magnetic materials such as Permalloy having a thickness between 1 μm and 2 μm is placed on a substrate 1 made of alumina, and a gap film 20 composed of alumina or silicon oxide having a thickness less than 0.5 μm is provided above the lower-side magnetic pole film 15. In the example shown in FIGS. 1 and 2, the coil 30 has two-layered turns, a lower-side coil 31 and an upper-side coil 32, both of which are formed by photo-etching processing of thin films deposited by vacuum evaporation or sputtering of copper or aluminum in the form of spiral patterns and are covered with a lower insulating film 33 and an upper insulating film 34 made of silicon oxide or polyimide. The coil 30 is inserted between the lower magnetic pole film 15 and the upper magnetic pole film 16 and the magnetic core 10 is formed in such a manner that the both the upper side magnetic pole film 16 and the lower-side magnetic pole film 15 contact the gap film 20 at the top part 10a. The read-and-write gap G is formed by lapping processing of the outer face of the top part 10a and the read-and-write gap G has a narrow gap length g defined by the thickness of the gap film 20 between the magnetic pole films 15 and 16. This kind of thin film magnetic head shown in FIGS. 1 and 2 is disclosed in, for example, laid-open Japanese Patent Application No. 84019/1980.

In the above described kind of thin film magnetic head, current semiconductor processing technologies for precisely defining the gap width w and the gap length g, present the reduction of the track width on a disc and a high recording density on the track to a certain degree. However, the performance of the magnetic head in recording and reading data on a disc is strongly influenced by the magnetic characteristics of magnetic materials used for the magnetic core 10. Specifically, as the signal frequency in reading data on a disc goes up to several MHz, it is required to use magnetic materials having a high magnetic permeability in a high frequency region for forming the magnetic head. In order to satisfy this requirement, anisotropic magnetic materials are often used and the axis of easy magnetization is fixed in the direction that the head gap width w is defined. This structure is explained in FIG. 3.

FIG. 3 is an enlarged view of the top part 10a of the lower magnetic pole film 15 of the magnetic core 10 where static magnetic domains without application of outer magnetic fields are shown. Magnetic domain walls are categorized into a Bloch magnetic domain wall, or 180-degree magnetic domain wall B18, which is a boundary of two adjacent magnetic domains having their magnetization directions opposite to each other, and a Neel magnetic domain wall, or 90-degree magnetic domain wall B9, which is a boundary of the adjacent magnetic domains having their magnetization directions vertical to each other. Therefore, in the magnetic pole film, as shown in FIG. 3, magnetic domains are composed of either hexagonal magnetic domains H or triangle magnetic domains T, and unless the head width w is large, magnetic domain configuration is such that hexagonal magnetic domains H expand and occupy the center of the head and triangle magnetic domains T are placed aside hexagonal magnetic domains H. Arrows in hexagonal magnetic domain H show directions of axes of easy magnetization which are parallel to the direction in which the head width w is defined. In reading and writing data on a disc, as magnetization force is applied in the direction vertical to the direction in which the head width w is defined, magnetic walls of hexagonal magnetic domains H are displaced in response to the magnetization force to rotate the magnetization directions of domains H 90 degrees. This manner of rotating magnetization direction of hexagonal magnetic domains H requires less energy as opposed to reversing the magnetization direction in the opposite direction. Such rotation of magnetization direction permits a higher magnetic permeability to be obtained.

However, if the gap width w is reduced to less than about 10 μm and the gap length g is reduced to less than about 0.5 μm, it is difficult to obtain a higher magnetic permeability. One reason is that where the gap width w is made small the area occupied by triangle magnetic domains T becomes greater than that occupied by hexagonal magnetic domains H. The other reason is that an the eddy current loss increases in the magnetic core 10 as the gap length g is made smaller for increasing the signal frequency for reading and writing data. A well-known solution to this problem is to form the magnetic core 10 in the form of multiple layered films. In IBM Disclosure Bulletin, Vol, 21, No. 11, 1939, pp. 4361, there is disclosed a structure in which a film made of Permalloy and a film made of silicon oxide are alternately laminated for forming multiplied layered films. In this structure, the eddy current loss is reduced by means of forming a thin film of Permalloy. Further, by making the thickness of films of silicon oxide small enough, thin films of Permalloy sandwiching a film of silicon oxide can be sufficiently coupled magnetically to form a magnetic circuit so that the growth of triangle magnetic domains T may be limited and hexagonal magnetic domains H may be enlarged dominantly. Furthermore, Japanese Patent Laying-open Nos. 4908/1989 and 42011/1989, disclose technologies in which Permalloy series alloys are used in order to solve the above mentioned problems in a similar way. In addition, in laid-open Japanese Patent Application No. 51515/1985, a magnetic head having multiple layered films made of Fe-Si alloys is disclosed.

However, as a practical manner, improvement in the magnetic permeability of multiple layered magnetic materials, is not easily attained. In particular, when, magnetic materials having a high coercive force are used for the magnetic recording media to improve signal level for high-density recording environments. For writing data on a magnetic disc made of this type of magnetic recording media, requires magnetic materials having high saturation magnetic flux density to form the magnetic core of the magnetic head. Under these conditions, it is very difficult to attain high magnetic permeability with multiple layered magnetic materials.

For example, the coercive force of the magnetic recording media used in the MIG (Metal In Gap) method may be employed up to 1500 Oe. A magnetic head using magnetic materials such as Permalloy can not give this kind of magnetic recording media enough energy. Therefore, it is required to use amorphous magnetic materials such as Mo-Permalloy alloys. From experimental observations, it has been proven that the magnetic permeability of multiple layered thin films formed with amorphous magnetic materials and silicon oxide is half the expected value of the magnetic permeability. Even by changing experimental conditions such as sputtering parameters and film thickness of magnetic films and silicon oxide films, no no prospective, practical use of the above mentioned materials and structure of multiple layered thin films have been found. In the above experiments, frequency dependence of magnetic permeability of multiple layered thin films was found to be rather good as a result of a multiple layered structure. This has been interpreted to mean that the generic property of high permeability magnetic materials is not reflected in individual magnetic thin films formed as above, and hence higher magnetic permeability can not be obtained.

SUMMARY OF THE INVENTION

An object of the present invention is to provide a thin film magnetic head having a magnetic core structured in multiple layered films which has a high magnetic permeability in a high frequency region and which is adequate for use with magnetic materials having a high coercive force capable of use in magnetic recording media in a magnetic disc storage apparatus.

Another object of the present invention is to provide a fabrication method of the above mentioned thin film magnetic head.

In the first aspect of the present invention, a thin film magnetic head comprises:

a magnetic circuit formed by alternately laminating a magnetic thin film composed of a magnetic metal having a soft magnetic property and a non-magnetic thin film composed of a non-magnetic metal.

Here, the magnetic thin film may be an amorphous Co alloy film having a thickness within a range from 0.1 $\mu$m to 0.5 $\mu$m.

The Co alloy may include Zr within a range from 3 to 6 atomic per cent.

The Co alloy may include Nb up to 6 atomic per cent.

The non-magnetic thin film may have a thickness within a range from 0.005 $\mu$m to 0.05 $\mu$m.

The non-magnetic thin film may be made of Ta.

A ratio of a thickness of the non-magnetic thin film to a thickness of the magnetic thin film may be within a range from 0.01 to 0.5.

In the second aspect of the present invention, a thin film magnetic head comprises:

a magnetic circuit formed by alternately laminating a magnetic thin film composed of a magnetic metal having soft magnetic property and a non-magnetic thin film composed of insulating nitride.

In the third aspect of the present invention, a fabrication method of a magnetic head having a magnetic circuit formed in a thin film comprises a step of:

alternately sputter-depositing a magnetic metal film having a soft magnetic property and a non-magnetic film to form a laminated film for constructing a magnetic circuit in a vacuum chamber evacuated before sputtering processing in high vacuum.

Here, while sputter-depositing the laminate film a gas pressure in the vacuum chamber may be maintained to be less than or equal to 5 mTorr.

A gas pressure in the vacuum chamber may be maintained to be less than or equal to 2 mTorr.

The sputtering may be performed after a gas pressure in the vacuum chamber is reduced to be less than or equal to $10^{-6}$ Torr.

The sputtering may be performed after a gas pressure in the vacuum chamber is reduced to be less than or equal to $10^{-7}$ Torr.

The sputter-depositing step may be performed in a magnetic field.

The above and other objects, effects, features and advantages of the present invention will become more apparent from the following description of embodiments thereof taken in conjunction with the accompanying drawings.

BRIEF DESCRIPTION OF THE DRAWINGS

Embodiments of the invention will now be described, by way of example and with reference to the accompanying drawings in which.

DETAILED DESCRIPTION OF PREFERRED EMBODIMENTS

The present invention is intended one to solve the above mentioned problems in conventional thin film magnetic heads by applying oxygen-free materials to non-magnetic thin films. Of particular importance is a phenomena that occurs in which the magnetic characteristics of magnetic thin films are unfavorably influenced by oxygen in the atmospheric gas used when sputter-depositing a silicon oxide film of layered thin films.

Layered thin films are formed by alternately sputter-depositing magnetic materials and non-magnetic materials on a substrate placed in a vacuum chamber. In sputtering a non-magnetic target made of materials such as silicon oxides containing oxygen, oxygen is released from the surface of the target and diffused in an atmospheric gas, and in the subsequent step of sputter-deposition of a magnetic film, oxygen contained in the atmospheric gas is partially transferred into the magnetic film which is made of metallic components, and hence, the existence of oxygen in the magnetic film tends to worsen the magnetic characteristics of the magnetic film. If an electric discharge onto the target of silicon oxide is experimentally stopped while sputter-depositing a magnetic thin film, an improvement of magnetic permeability of layered thin films is observed. In the part in order to reduce the unfavorable effect of oxygen on the magnetic characteristics of magnetic films, the atmospheric gas would be replaced every time after the silicon oxide was sputtered. This method is not practical, however, because it requires a process in which the vacuum chamber is evacuated every time the atmospheric gas is replaced and it takes a long time to perform this repetitive process in a repetitive manner.

In the present invention, the above mentioned problem is solved by means of forming layered thin films by laminating alternately magnetic thin films which are composed of magnetic metals and non-magnetic thin films which are composed of oxygen-free non-magnetic metals or insulating nitrides.

As for non-magnetic metallic materials in the above structure of layered thin films, Ta, Ti, Mo, U, W, Zr, Nb, Au, Pt, Ag, Pb, Cu, Al, Si and their alloys are applicable, and specifically, Ta is preferable for capturing oxygen as an oxygen getter. As for nitrides used for non-magnetic thin films, for example, silicon nitrides are preferable.

Figure 1:
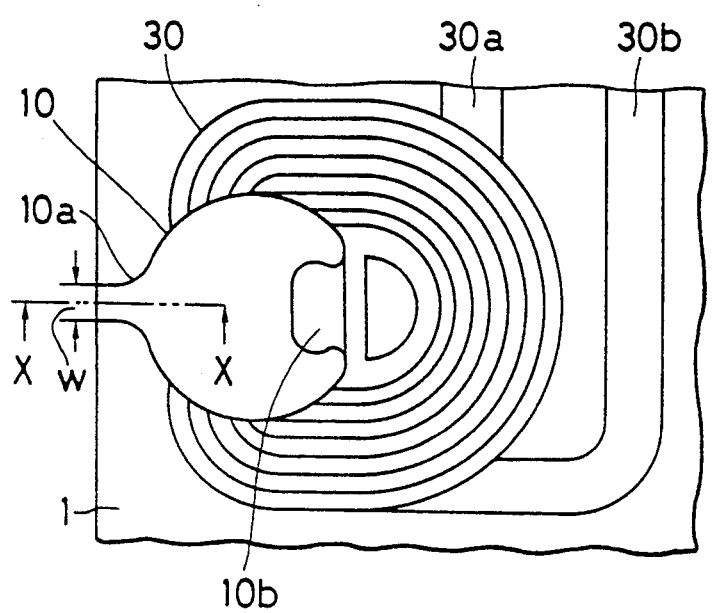
FIG. 1 is an upper plan view showing a structure of a conventional thin film magnetic head.
Figure 4:
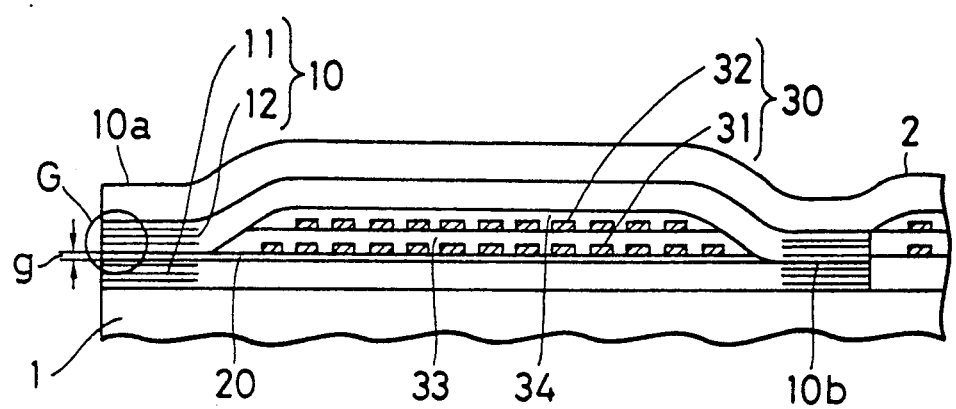
FIG. 4 is a partial enlarged cross-sectional view showing one embodiment of a thin film magnetic head of the present invention.
Figure 5:
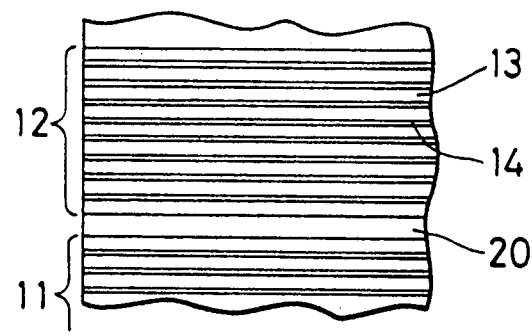
FIG. 5 is an enlarged cross-sectional view showing a part of multiple layered thin films used for a magnetic circuit of the thin film magnetic head shown in FIG. 4.

FIGS. 4 and 5 are a partial enlarged cross-sectional view of a thin film magnetic head of the present invention and an enlarged cross-sectional view of layered films of its magnetic circuit, respectively. The overall structure of the thin film magnetic head shown in FIGS. 4 and 5 is similar to the prior art shown in FIG. 1. In FIGS. 4 and 5, the like parts to those in FIGS. 1 and 2 are designated with like numerals defined in FIGS. 1 and 2, which will not be described again.

Figure 2:
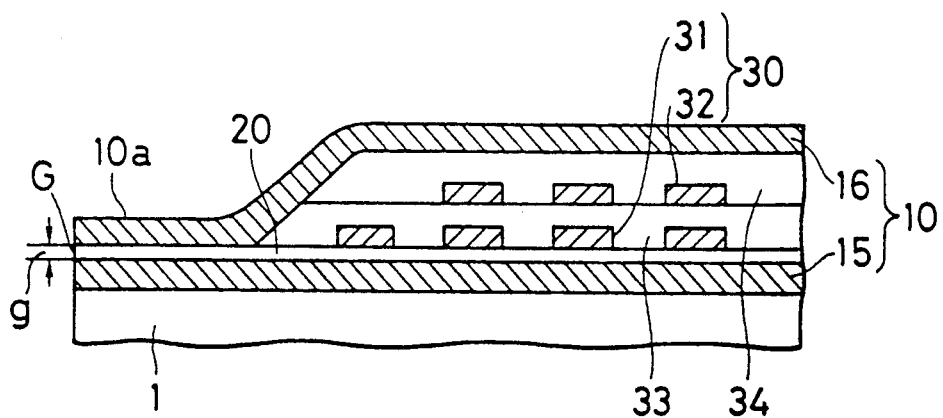
FIG. 2 is a partial enlarged cross-sectional view along line X—X in FIG. 1 showing a conventional thin film magnetic head.
Figure 3:
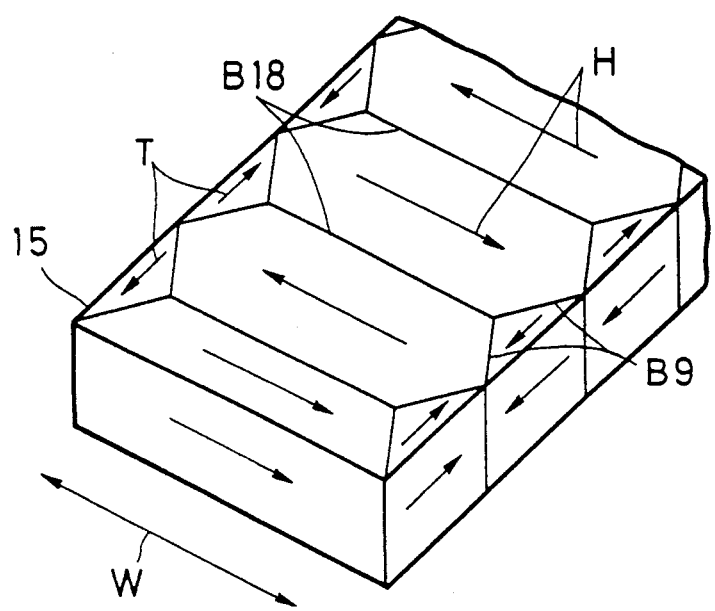
FIG. 3 is a perspective view showing a configuration of a hexagonal magnetic domain and a triangle magnetic domain in the top end part of a magnetic thin film formed for a magnetic core in a conventional thin film magnetic head.

FIG. 4 shows a cross-sectional view of a part almost exactly corresponding to the part shown in FIG. 2. The different feature in FIG. 4 from that in FIG. 2 is a layered structure shown in FIG. 5 where a magnetic circuit 10 which is composed of lower side layered films 11 and upper side layered films 12 has an alternately layered structure of magnetic thin films 13 and non-magnetic thin films 14. Layered films 11 and 12 have a thickness of, for example, 2 μm, respectively, and between layered films 11 and 12, a gap G for reading and writing is formed with its thickness defined by the thickness g of the gap film 20 made of aluminum oxide or silicon oxide. In a magnetic head of disc storage apparatus used for storing a large amount of data, the length of gap G is defined to be small enough, for example, 0.3 μm, to attain a high recording density and the width of the gap G is defined to be a few to 10 μm in order to trace the narrow tracks on rotating discs. As shown in FIG. 1, layered films 11 and 12 are bonded to each other at the other end side 10b of the substrate of the magnetic circuit 10.

As for magnetic metallic materials used for magnetic thin films 13 in layered films 11 and 12, Co alloys are preferable in order to write data on a magnetic recording medium having a high coercive forcer. For example, the magnetic thin film 13 may be formed as an amorphous material composed of Co alloy including 3 to 6% Zr. In addition, it is preferable to reduce the magneto-elastic effect of the magnetic thin film 13 by adding Nb up to 6% in the above Co alloy. As for non-magnetic materials used for non-magnetic thin films 14, various kinds of non-magnetic metals or insulating nitrides both exclusive of oxygen may be used. Ta is preferable in order to capture oxygen as an oxygen getter. The non-magnetic thin film 14 is required to be formed thin enough so that magnetic thin films 13 adjacent above below the non-magnetic thin film 14 may be magnetically coupled effectively, and hence the thickness ratio between thin films 13 and 14 is selected to be from 0.01 to 0.5.

Though magnetic thin films 13 and non-magnetic thin films 14 may be formed by vacuum evaporation, in the case of forming magnetic thin films 13 composed of Co alloys in an amorphous state having good magnetic properties, a sputtering process is preferable, especially, DC magnetron sputtering. For forming layered films 11 and 12 each composed of thin films 13 and 14 on the substrate 1, a sputtering process is performed by rotating a holder supporting the substrate 1 in an evacuated Ar gas atmosphere and by moving the substrate 1 onto a specific target for respective thin film materials. In this case, the thickness of each of magnetic thin films 13 and non-magnetic thin films 14 may be controlled precisely by selecting a discharge power applied to each target and a time during which the substrate 1 is exposed to the specific target. That is, in the case of forming a Co alloy thin film of 0.1 μm thickness, the above control conditions may be selected as follows: power of 450 W; and time of 27 sec.

The upper side layered film 12 and the lower-side layered film 11 each composed of magnetic thin films 13 and non-magnetic thin films 14 formed as described above are shaped in a form required to define a magnetic core 10 of the thin film magnetic head as shown in FIG. 1 by means of, for example, ion milling processing.

Figure 6:
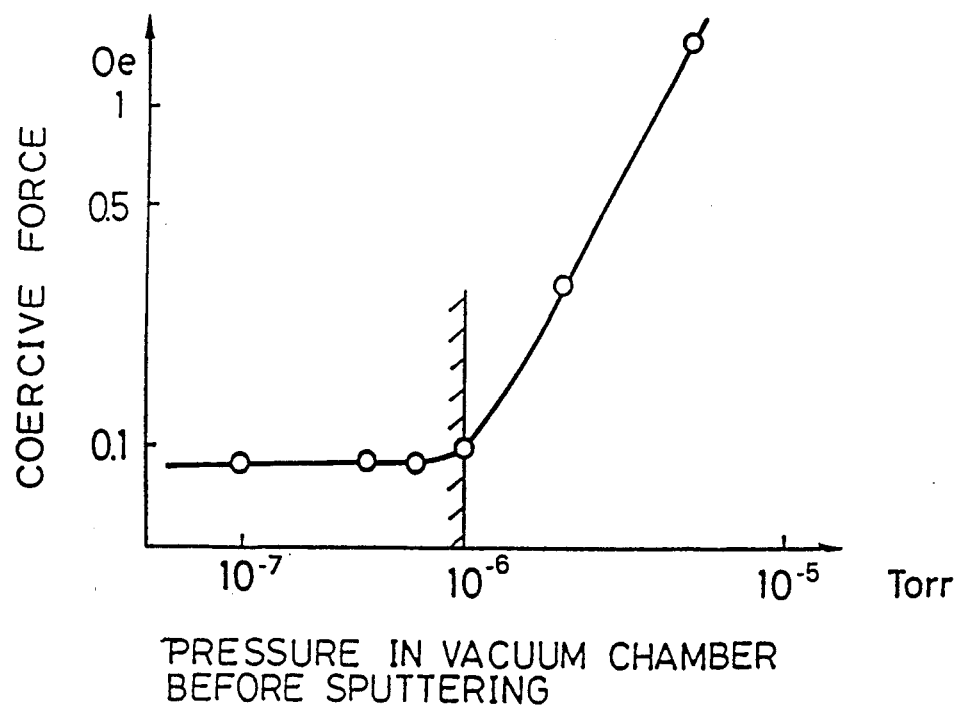
FIG. 6 is a diagram showing the effect of the pressure in the vacuum chamber evacuated prior to sputtering process for depositing magnetic thin films of a multiple layered thin film on coercive force.
Figure 7:
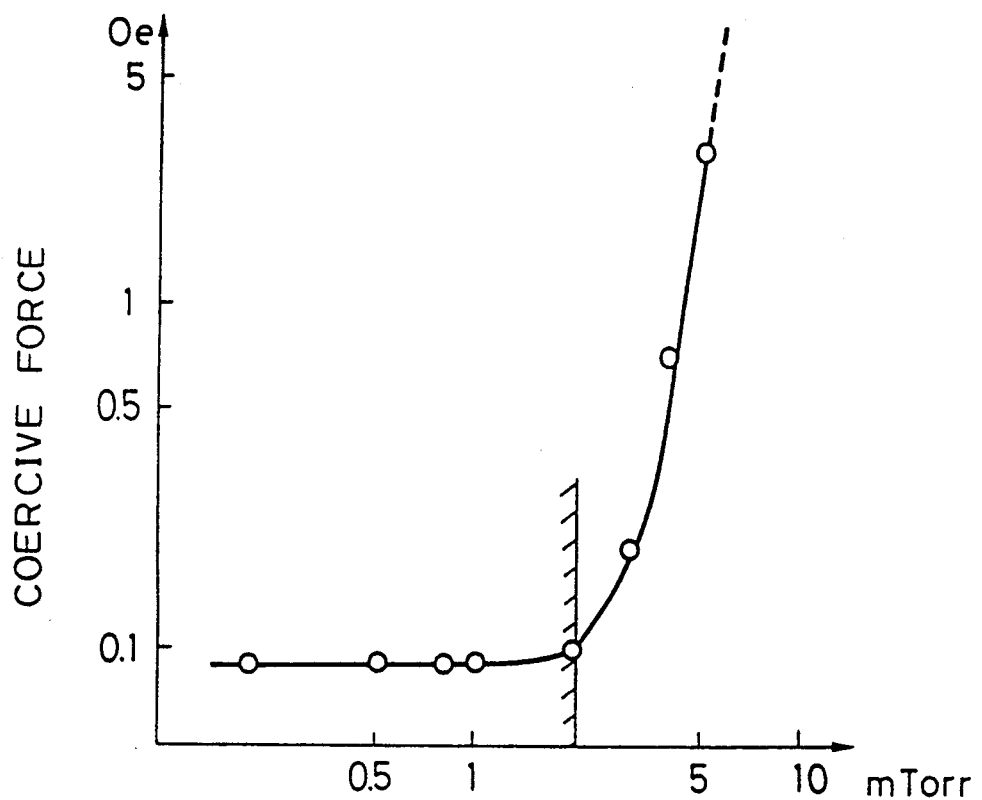
FIG. 7 is a diagram showing the effect of the pressure of the atmospheric gas in a sputtering process for depositing magnetic thin films.

A magnetic material used for the magnetic circuit 10 of the magnetic head is required to have a soft magnetic property, that is high permeability and low coercive force. The conditions for forming film layers in the above mentioned sputtering process are the magnetic thin film 13 have a thickness of 1 μm formed on a glass substrate and its components are 3.5% Zr-6.5% Nb-Co. The relationship between these film forming conditions and the coercive force of the magnetic thin films 13 are shown in FIGS. 6 and 7. FIG. 6 shows the relationship in the vacuum chamber between the vacuum pressure p before sputtering of the sputtering apparatus (which includes the targets and the substrate) and the coercive force Hc of the Co alloy magnetic thin film 13. According to FIG. 6, the coercive force Hc becomes less than 0.1 Oe by evacuating the vacuum chamber not more than $10^{-7}$ Torr where the magnetic thin film 13 has a soft magnetic property. And furthermore, FIG. 7 shows the relationship between the pressure p of the atmospheric Ar gas in sputter processing in the vacuum chamber and the coercive force Hc. From FIG. 7, it is found that the coercive force Hc is less than 0.1 Oe by evacuating the vacuum chamber not more than 2 mTorr where the magnetic thin film 13 has soft magnetic property.

Figure 8:
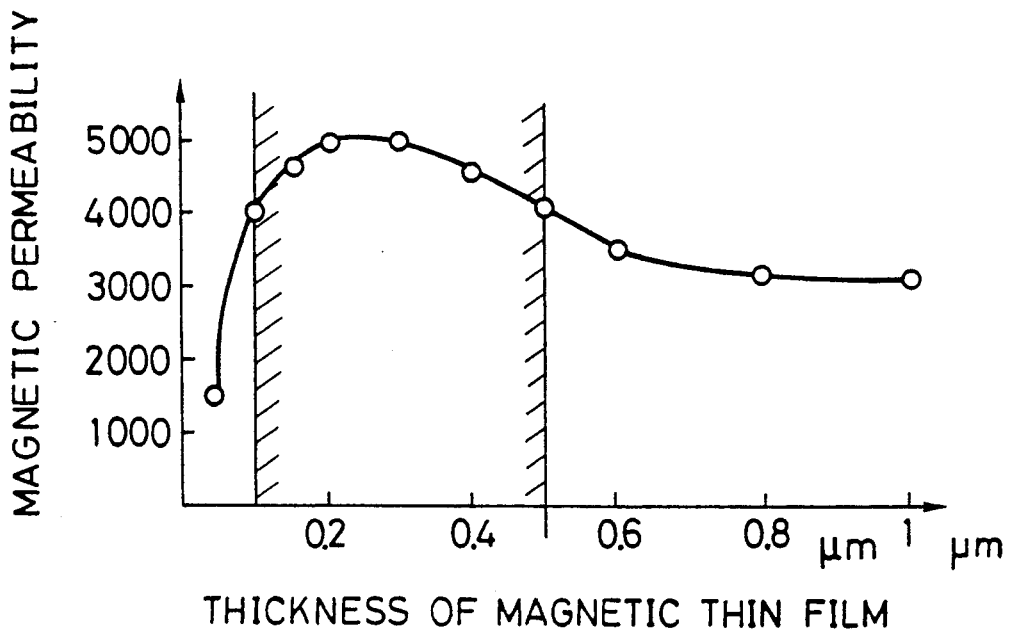
FIG. 8 is a diagram showing the relationship between the magnetic permeability of a multiple layered thin film and the film thickness of a magnetic thin film.
Figure 9:
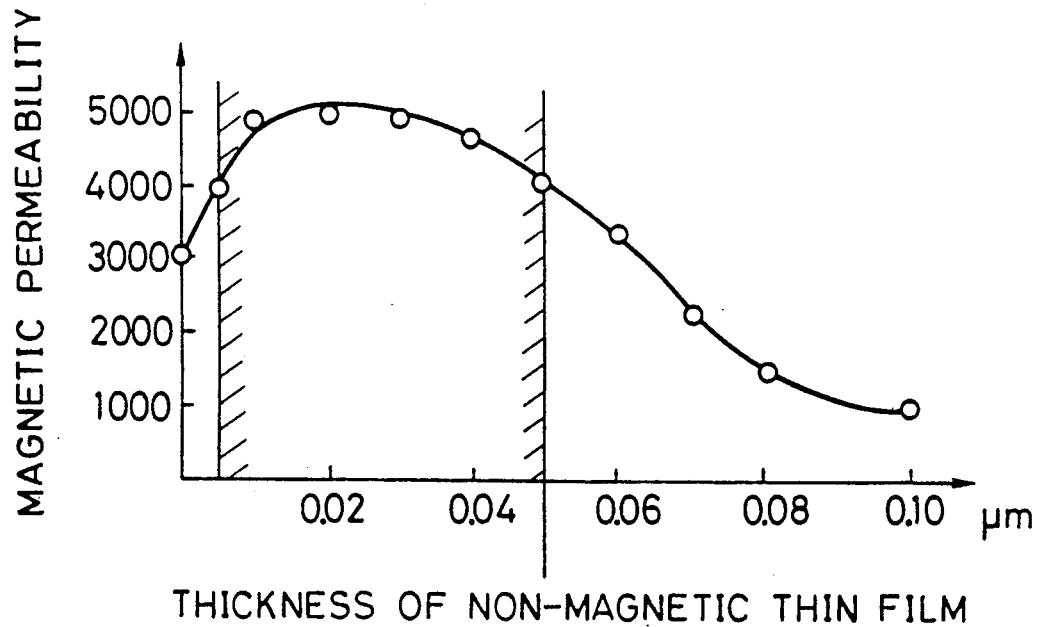
FIG. 9 is a diagram showing the relationship between the magnetic permeability of a multiple layered thin film and the thickness of a non-magnetic thin film.

Next, FIGS. 8 and 9 show the relationship between the film thickness t of the Co alloy magnetic thin film 13 and the Ta non-magnetic thin film 14 and the magnetic permeability μ of the layered films 11 and 12. FIG. 8 shows the measured magnetic permeability μ of the layered films at 5 MHz, which is the highest frequency with which the magnetic head is used, in relation to the film thickness t of the magnetic thin film 13 when with the film thickness of the non-magnetic thin film 14 at the constant value 0.02 μm. As shown in FIG. 8, a magnetic permeability μ greater than 4000 can be attained with the thickness of the magnetic thin film 13 between 0.1 μm and 0.50 μm. Where the thickness of the magnetic thin film 13 is less than 0.1 μm, as the thickness ratio of the non-magnetic thin film 14 to that of the magnetic thin film 13 becomes too great, it is estimated that the expansion of the triangle magnetic domain is dominant due to the insufficient magnetic coupling between adjacent magnetic thin films 13. Where the thickness of the magnetic thin film 13 is greater than 0.5 μm, it is estimated that the thin film configuration is not effective to reduce the increasing eddy current losser in the high frequency region.

FIG. 9 shows the measured magnetic permeability μ of the layered films at 5 MHz, which is the highest frequency with which the magnetic head is used, in relation to the film thickness t of the non-magnetic thin film 14, with the film thickness of the magnetic thin film 13 at a constant value of 0.2 μm which is determined by the measurement shown in FIG. 8. As shown in FIG. 9, a magnetic permeability μ greater than 4000 can be attained with the thickness of the non-magnetic thin film 14 between 0.005 μm and 0.05 μm. Where the thickness of the non-magnetic thin film 14 is less than 0.005 μm, it is estimated that some parts of adjacent magnetic thin films 13 may contact to each other and that the non-magnetic thin film 14 would not effectively function. Where the thickness of the non-magnetic thin film 14 is greater than 0.05 μm, it is estimated that the magnetic coupling between adjacent magnetic thin films 13 would not be sufficient.

Figure 10:
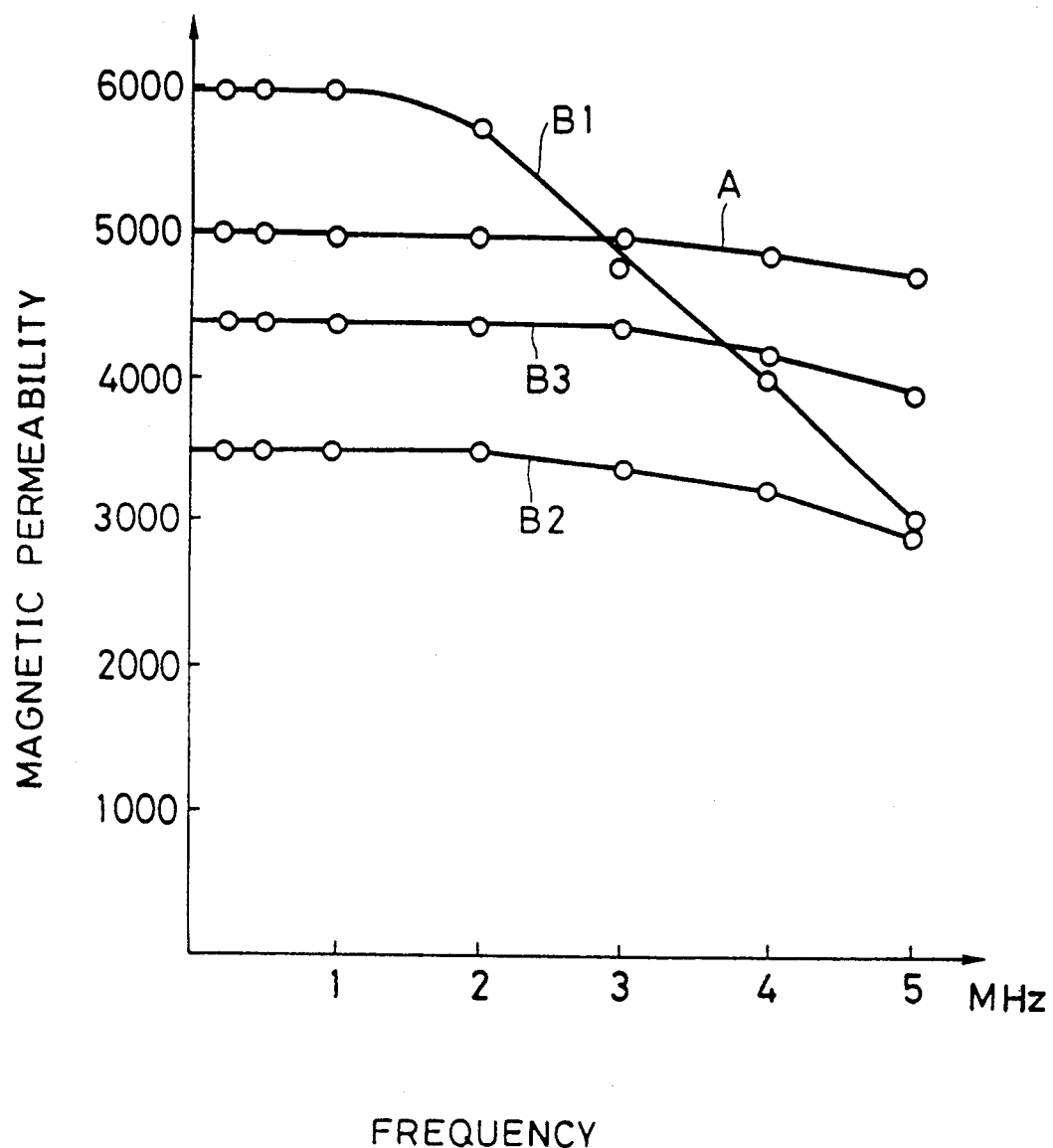
FIG. 10 is a diagram showing the frequency dependence of magnetic permeability with respect to an example of a multiple layered thin film of the present invention and comparative samples.

FIG. 10 shows the frequency dependence of the magnetic permeability μ in some layered films formed experimentally with optimal parameters determined by the above mentioned measurements. The curve A corresponds to the layered film, i.e. the sample A formed according to the present invention under the following conditions; the vacuum pressure before sputtering in the vacuum chamber is $5 \times 10^{-7}$ Torr and the gas pressure while sputtering in the vacuum chamber is 0.8 mTorr. By DC magnetron sputtering, the Co alloy magnetic thin film 13 of 0.2 μm thickness and the Ta non-magnetic thin film 14 are alternately laminated and finally the thickness of the layered film is attained to be 1 μm.

The other three layered films are formed experimentally under the following conditions:

Sample B1 (curve B1): a single layered Co alloy film of 1 μm thickness formed by the same sputtering processing as of the sample A.

Sample B2 (curve B2): a multiple layered film of 1 μm thickness including silicon oxide thin films for non-magnetic thin films 14 and the Co alloy magnetic thin film 13, formed by co-sputtering under the same sputtering conditions as of the sample A. In discharging the silicon oxide target, a high frequency discharge mode is used.

Sample B3 (curve B3): the same materials, thickness of films and sputtering conditions as those of sample B2 are used and the Co alloy target and the silicon oxide target are alternately discharged.

All the samples A, B1, B2 and B3 are formed on a glass substrate of 8 mm square and the Co alloy has the previously mentioned components. The magnetic permeability was measured by shunt core method.

As shown in FIG. 10, the magnetic permeability in the sample B1 formed as a single layered film is higher at the lower frequencies but is extremely lower at the higher frequencies. In the sample B2 formed as a multiple layered film having silicon oxide in its non-magnetic thin films, the frequency dependence of the magnetic permeability is rather improved in comparison with the sample B1 but the overall magnetic permeability is far less than 4000 and hence the sample B2 is not directly applicable to an actual use of magnetic heads. In the sample B3, during sputter-deposition of the magnetic thin film, the amount of oxygen released from silicon oxide can be reduced by altering discharging targets in the sputter processing and hence the magnetic permeability is further improved in comparison with the sample B2. Even in the sample B3, the magnetic permeability in the high frequency region around 5 MHz is not greater than 4000 so that the sample B3 can not be practically used.

In comparison with comparable samples B1, B2 and B3, the magnetic permeability μ of sample A is up to be around 5000 and the frequency dependence is almost neglectable and even in the high frequency region around 5 MHz, the magnetic permeability μ is established to be 4700. In the sample A, as the material used for non-magnetic thin films does not contain oxygen and the magnetic thin film is not affected by oxygen, the Co alloy with its high magnetic permeability is fully exhibited in the magnetic thin films. In addition, it is estimated that even using a metallic alloy such as Ta for non-magnetic the thin film does not bring much eddy current loss to the magnetic circuit.

According to the present invention, by means of forming multiple layered films for magnetic circuits by laminating alternately magnetic thin films made of magnetic metal alloys having a soft magnetic property and non-magnetic thin films made of non-magnetic metal with their film thickness defined to be an adequate value, respectively, and by using sputter processing, it will be appreciated that the magnetic permeability greater than 4000 can be attained even in the high frequency region for high density recording such as around 5 MHz, so that high capability in reading and writing data may be given to the magnetic head formed as in the above mentioned structure and material processing.

Also if nitrides having an electric insulating property, such as silicon nitride, are used for the non-magnetic thin films, the unfavorable effect of oxygen on magnetic thin films is not created and the eddy current loss in the high frequency region can be reduced so that the frequency dependence of the magnetic permeability can be further improved.

It will be appreciated that by applying a magnetic field with 50 to 60 Oe in a designated direction while sputter processing, magnetization characteristic of magnetic thin films can include a magnetic anisotropy. and that higher magnetic permeability of the multiple layered film can be attained.

As described above, in a thin film magnetic head of the present invention, by means of forming multiple layered films for magnetic circuits by laminating alternately magnetic thin films made of magnetic alloys having a soft magnetic property and non-magnetic thin films made of non-magnetic metal, especially Ta or electric insulating nitrides, and by means of using material processing in fabricating the thin film magnetic head, by means that the multiple layered thin films are fabricated by sputtering process in which a magnetic thin film layer composed of magnetic alloys and a non-magnetic thin film layer composed of non-magnetic materials are alternately deposited in a vacuum chamber which is evacuated in high vacuum prior to sputtering processing, the following advantages can be obtained.

(a) As non-magnetic metals such as Ta having oxygen capturing property or insulating nitrides are used for materials for non-magnetic thin films, magnetic thin films can be formed in sputtering processing in oxygen-free atmospheric gas. Therefore, by removing the unfavorable effect of oxygen over magnetic metals used for forming magnetic thin films, intrinsic properties of magnetic metals such as high magnetic permeability can be exhibited within multiple layered films for magnetic circuits. By controlling the film thickness of magnetic thin films and non-magnetic thin films forming a multiple layered film to be an adequate value, the eddy current loss can be reduced and the frequency dependence of magnetic permeability is improved so as to maintain high magnetic permeability even in the higher frequency region. As a result, in the present invention, the read-and-write performance of thin film magnetic heads can be further improved for high-density recording environments.

(b) Even in cases when magnetic metals for magnetic thin films have high saturation magnetic flux densities such as Co alloys, as the multiple layered film for magnetic circuits have high magnetic permeability in higher frequency regions, according to the present invention, high performance thin film magnetic heads can be provided in high density recording environments using magnetic recording media having a high coercive force.

(c) As multiple layered films for magnetic circuits can be formed efficiently within a short period of time by continuous co-sputtering processing for depositing alternately a magnetic film and a non-magnetic film, the present invention brings several advantages in the commercial mass production of thin film magnetic heads.

So far, this invention enables a commercial mass production of thin film magnetic heads with high performance in recording data on magnetic media with high density and reading such recorded data, and the practice of the present invention is expected to contribute to large data storage apparatus development and to an improvement in recording and an data reading performance with thin film magnetic heads.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. In a thin-film magnetic head comprising a magnetic core composed of upper and lower magnetic pole films spaced apart to define a read-write gap and a coil disposed between the upper and lower magnetic pole films in an area outside of the gap, the improvement wherein:

said upper and lower magnetic pole films each comprise a thin-film laminate having alternating magnetic and non-magnetic thin films, said magnetic thin-film comprising an amorphous Co alloy having a soft magnetic property and a thickness within a range of 0.1 $\mu$m to 0.5 $\mu$m and said non-magnetic thin-film comprising a non-magnetic metal having a thickness within a range from 0.005 $\mu$m to 0.05 $\mu$m.

2. A thin film magnetic head as claimed in claim 1, wherein said Co alloy includes Zr within a range from 3 to 6 atomic per cent.

3. A thin film magnetic head as claimed in claim 2, wherein said Co alloy includes Nb up to 6 atomic per cent.

4. A thin film magnetic head as claimed in claim 1, wherein said non-magnetic thin film is made of Ta.

5. A thin film magnetic head as claimed in claim 1, wherein a ratio of a thickness of said non-magnetic thin film to a thickness of said magnetic thin film is within a range from 0.01 to 0.5.

6. In a thin film magnetic head comprising a magnetic core composed of upper and lower magnetic pole films spaced apart to define a read-write gap and a coil disposed between the upper and lower magnetic pole films in an area outside of the gap, the improvement wherein:

said upper and lower magnetic pole films each comprise a thin-film laminate having alternating magnetic and non-magnetic thin films, said magnetic thin-film comprising an amorphous Co alloy having a soft magnetic property and a thickness within a range from 0.1 μm to 0.5 μm and said non-magnetic thin film comprising insulating nitride having a thickness within a range from 0.005 μm to 0.05 μm.

7. A thin film magnetic head as claimed in claim 6, wherein said Co alloy includes Zr within a range from 3 to 6 atomic per cent.

8. A thin film magnetic head as claimed in claim 7, wherein said Co alloy includes Nb up to 6 atomic per cent.

9. A thin film magnetic head as claimed in claim 6, wherein said non-magnetic thin film is made of Ta.

10. A thin film magnetic head as claimed in claim 6, wherein a ratio of a thickness of said non-magnetic thin film to a thickness of said magnetic thin film is within a range from 0.01 to 0.5.

11. In a thin-film magnetic head comprising a magnetic core composed of upper and lower magnetic pole films spaced apart to define a read-write gap and a coil disposed between the upper and lower magnetic pole films in an area outside of the gap, the improvement wherein:

said upper and lower magnetic pole films each comprise a thin-film laminate having alternating magnetic and non-magnetic thin films, said magnetic thin-film comprising an amorphous Co alloy having a soft magnetic property and a thickness within a range of 0.1 μm to 0.5 μm and said non-magnetic thin-film comprising a non-magnetic metal, wherein a ratio of a thickness of said non-magnetic thin film to a thickness of said magnetic thin film is within a range from 0.01 to 0.5.

12. A thin film magnetic head as claimed in claim 11, wherein said Co alloy includes Zr within a range from 3 to 6 atomic per cent.

13. A thin film magnetic head as claimed in claim 12, wherein said Co alloy includes Nb up to 6 atomic per cent.

14. A thin film magnetic head as claimed in claim 11, wherein said non-magnetic thin film is made of Ta.

* * * * *